(12) United States Patent
Slavens et al.

(10) Patent No.: US 10,329,921 B2
(45) Date of Patent: Jun. 25, 2019

(54) COOLING CONFIGURATION FOR A COMPONENT

(71) Applicant: United Technologies Corporation, Hartford, CT (US)

(72) Inventors: Thomas N. Slavens, Vernon, CT (US); Carey Clum, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 812 days.

(21) Appl. No.: 14/878,498

(22) Filed: Oct. 8, 2015

(65) Prior Publication Data

US 2016/0115871 A1 Apr. 28, 2016

Related U.S. Application Data

(60) Provisional application No. 62/068,354, filed on Oct. 24, 2014.

(51) Int. Cl.
G01K 1/14 (2006.01)
G01K 13/02 (2006.01)
F01D 5/18 (2006.01)

(52) U.S. Cl.
CPC .............. F01D 5/186 (2013.01); Y02T 50/676 (2013.01)

(58) Field of Classification Search
None
See application file for complete search history.

(56) References Cited

U.S. PATENT DOCUMENTS

| | | | | |
|---|---|---|---|---|
| 4,595,298 A | * | 6/1986 | Frederick | G01K 13/02 374/144 |
| 6,164,912 A | * | 12/2000 | Tabbita | F01D 5/186 416/97 R |
| 7,306,026 B2 | * | 12/2007 | Memmen | B22C 7/02 164/361 |
| 7,374,401 B2 | | 5/2008 | Lee | |
| 7,537,431 B1 | | 5/2009 | Liang | |
| 8,092,176 B2 | * | 1/2012 | Liang | F01D 5/186 416/231 R |
| 8,168,912 B1 | | 5/2012 | Liang | |
| 8,245,519 B1 | | 8/2012 | Liang | |
| 8,870,536 B2 | * | 10/2014 | Lacy | F01D 5/186 416/97 R |
| 2006/0083614 A1 | | 4/2006 | Cunha et al. | |
| 2007/0177975 A1 | | 8/2007 | Luczak et al. | |
| 2008/0131285 A1 | | 6/2008 | Albert et al. | |
| 2012/0216608 A1 | * | 8/2012 | Schleif | F01D 17/08 73/112.01 |
| 2013/0280081 A1 | | 10/2013 | Propheter-Hinckley et al. | |
| 2016/0003056 A1 | | 1/2016 | Xu | |

* cited by examiner

*Primary Examiner* — Kayla McCaffrey
(74) *Attorney, Agent, or Firm* — Carlson, Gaskey & Olds, P.C.

(57) ABSTRACT

A component includes at least one thermal riser that extends from an exterior surface of the component. At least one cooling passage extends through a wall and adjoins an interior cooling passage and provides an exterior surface. At least one cooling passage is configured to direct cooling fluid through the wall adjacent to at least one thermocouple.

19 Claims, 5 Drawing Sheets

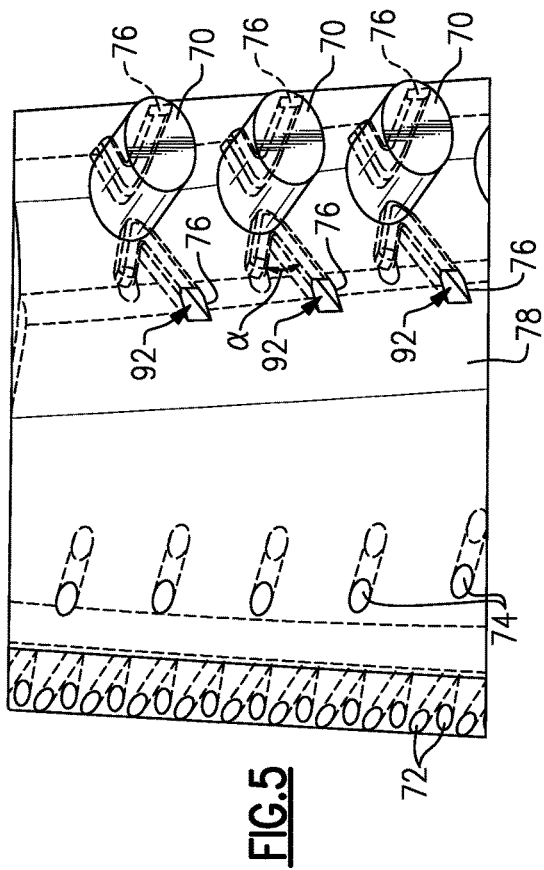
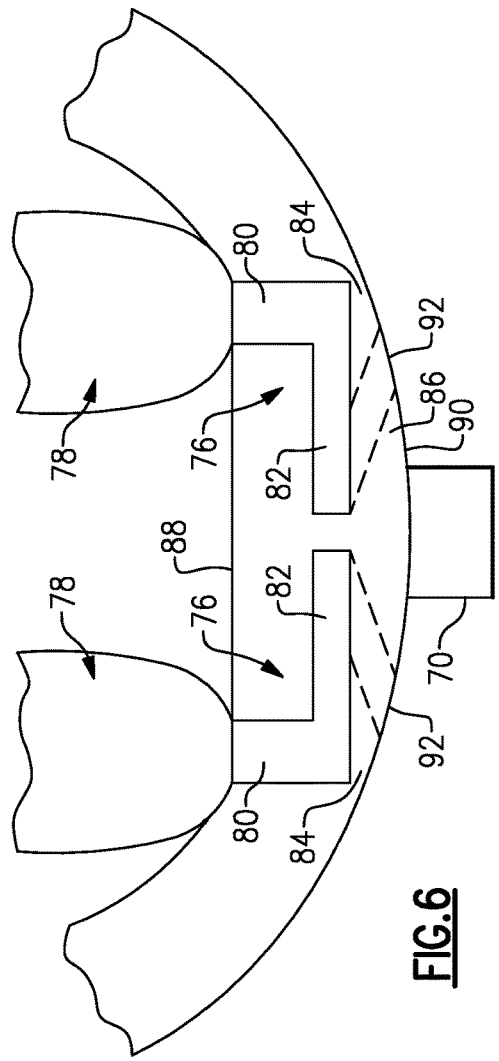
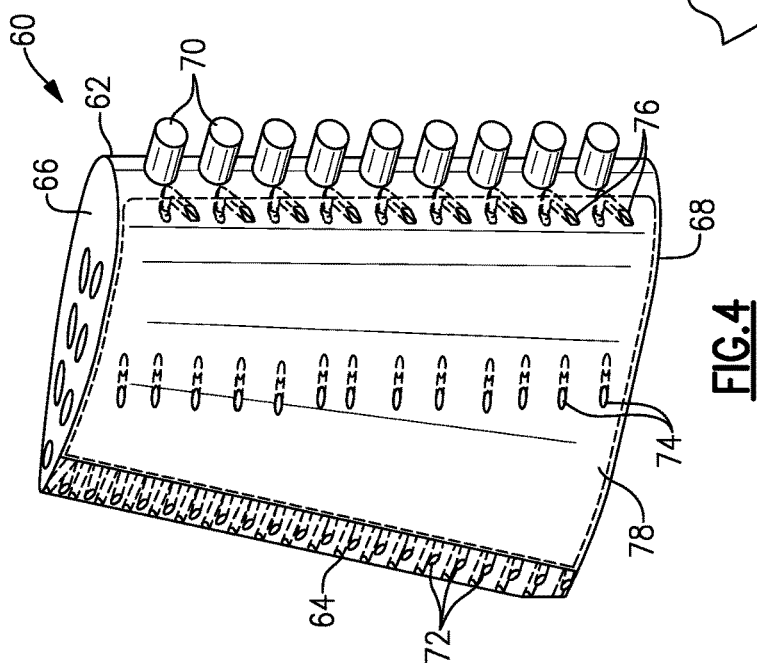

COOLING CONFIGURATION FOR A COMPONENT

CROSS-REFERENCE TO RELATED APPLICATIONS

This application claims priority to U.S. Provisional Application No. 62/068,354 which was filed on Oct. 24, 2014 and is incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In the pursuit of ever higher efficiencies, gas turbine manufacturers have long relied on high and higher turbine inlet temperatures to provide boosts to overall engine performance. In typical modern gas turbine engine applications, gas path temperatures within the turbine exceed the melting point of the component constituent materials. Due to this, dedicated cooling air must be extracted from the compressor and used to cool gas path components in the turbine. This incurs significant cycle penalties especially when cooling air is utilized in the low pressure turbine (sometimes referred to as the power turbine).

A significant driver of turbine cooling is the spatially varying temperature distribution of the gas path. The nature of the combustion method and geometry produces a variance is gas temperature in both the radial and circumferential directions of flow. This variation in gas temperature also shifts and changes in magnitude and shape as the hot gases progress through the turbine.

To help minimize the amount of cooling air needed for the gas path turbine components, an understanding of the spatially resolved temperature of the gas stream is desired to tailor cooling to areas of high heat load. This understanding is achieved through temperature measurements through the gas path. These are typically achieved through direct measurement on thermocouple probes, such as kiel head probes, protruding into the gas path situated. The thermocouple is typically attached to the leading edge of a static structure or rake and protrudes into the gas path allowing direct measurement of the total gas temperature.

However, since the probe is mounted to a static structure which generally needs to be several hundred degrees cooler than the gas path, film cooling on the static structure is generally needed to cool the static structure. The film cooling, which is typically machined into the static structure, generally directs the cooling air at the thermocouple. This perturbs the flow temperature measurements by the thermocouple and causes large discrepancies in actual values. Therefore, there is a need for improved temperature measurements in the gas path of a gas turbine engine.

SUMMARY

In one exemplary embodiment, a component includes at least one thermal riser that extends from an exterior surface of the component. At least one cooling passage extends through a wall and adjoins an interior cooling passage and provides an exterior surface. At least one cooling passage is configured to direct cooling fluid through the wall adjacent to at least one thermocouple.

In a further embodiment of the above, at least one thermocouple includes a plurality of thermocouples that extend along a leading edge of the component.

In a further embodiment of any of the above, a plurality of trailing edge cooling passages extend along a trialing edge of the component and a plurality of side cooling passages located on circumferentially facing sides of the component.

In a further embodiment of any of the above, at least one cooling passage includes a curvature in a radial and a curvature in an axial direction.

In a further embodiment of any of the above, at least one cooling passage at least partially circumscribes at least one thermal riser.

In a further embodiment of any of the above, at least one cooling passage includes a first cooling passage that extends radially inward and a second cooling passage extends radially outward.

In a further embodiment of any of the above, the first cooling passage includes a first film cooling hole and the second cooling passage includes a second cooling film hole. The first film cooling hole intersects the second film cooling hole.

In a further embodiment of any of the above, at least one cooling passage includes an inlet portion, an intermediate portion, and an outlet portion. The intermediate portion is misaligned relative to the outlet portion.

In a further embodiment of any of the above, the inlet portion extends in a generally perpendicular direction from the interior cooling passage.

In a further embodiment of any of the above, the component is at least one of an airfoil or a rake.

In another exemplary embodiment, a gas turbine engine includes a combustor section. A component is located downstream of the combustor section and includes at least one thermal riser with an embedded temperature measurement device that extends from a leading edge of the component. At least one cooling passage extends through a wall and adjoins an interior cooling passage and provides an exterior surface At least one cooling passage is configured to direct cooling fluid through the wall adjacent at least one thermal riser.

In a further embodiment of the above, at least one cooling passage includes a curvature in a radial and a curvature in an axial direction and at least partially circumscribes at least one thermal riser.

In a further embodiment of any of the above, at least one cooling passage includes a first cooling passage that extends radially inward and a second cooling passage that extends radially outward.

In a further embodiment of any of the above, the first cooling passage includes a first film cooling hole and the second cooling passage includes a second cooling film hole. The first film cooling hole intersects the second film cooling hole.

In a further embodiment of any of the above, at least one cooling passage includes an inlet portion, an intermediate portion, and an outlet portion. The intermediate portion is misaligned relative to the outlet portion.

In a further embodiment of any of the above, the inlet portion extends in a generally perpendicular direction from the interior cooling passage.

In another exemplary embodiment, a method of cooling a component includes directing a cooling fluid through at least one non-linear cooling passage in an exterior wall of a component adjacent a thermal riser. The cooling fluid is directed through a film cooling hole of at least one non-linear cooling passage away from the thermal riser.

In a further embodiment of the above, at least one non-linear cooling passage includes a first cooling passage that extends radially inward and a second cooling passage that extends radially outward.

In a further embodiment of any of the above, the first cooling passage and the second cooling passage at least partially circumscribe the thermal riser.

In a further embodiment of any of the above, at least one cooling passage includes an inlet portion, an intermediate portion, and an outlet portion. The intermediate portion is misaligned relative to the outlet portion.

BRIEF DESCRIPTION OF THE DRAWINGS

FIG. 4 illustrates internal passages in the component of FIG. 2.

FIG. 5 illustrates an enlarged view of FIG. 4 surrounding a leading edge.

FIG. 6 illustrates film cooling holes and cooling passages in more detail.

DETAILED DESCRIPTION

Figure 1:
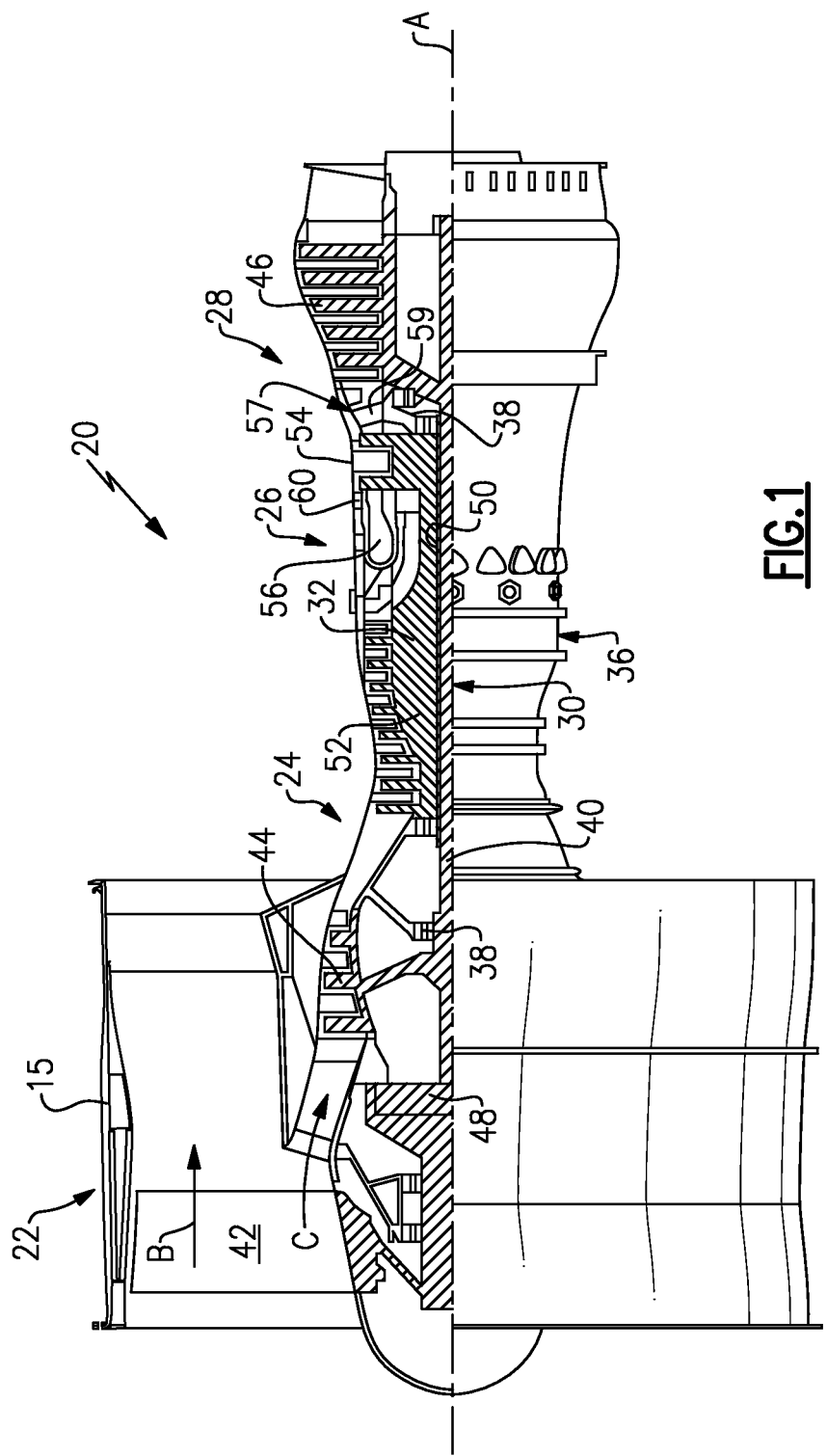
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 3:
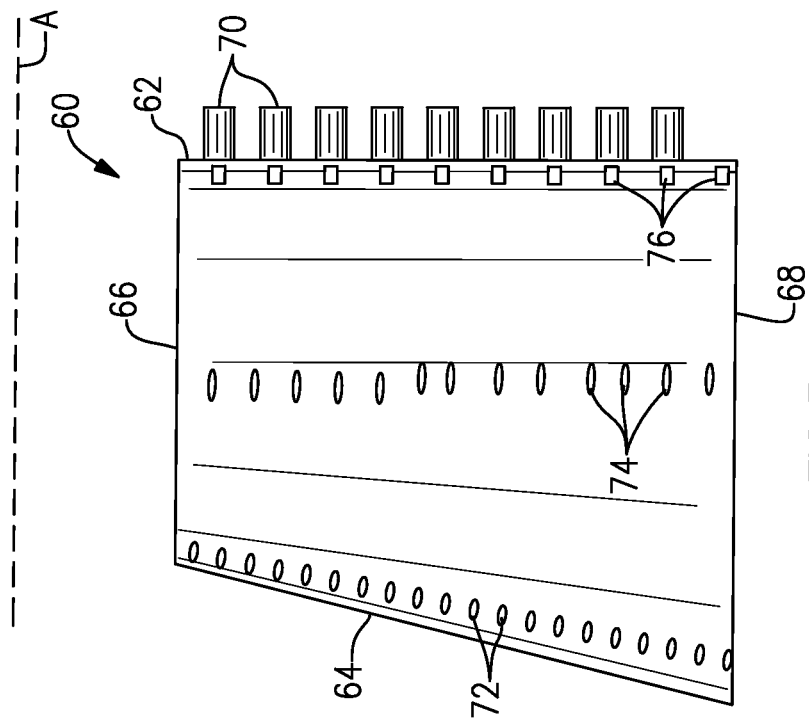
FIG. 3 illustrates a side view of the example gas turbine engine component of FIG. 2.
Figure 2:
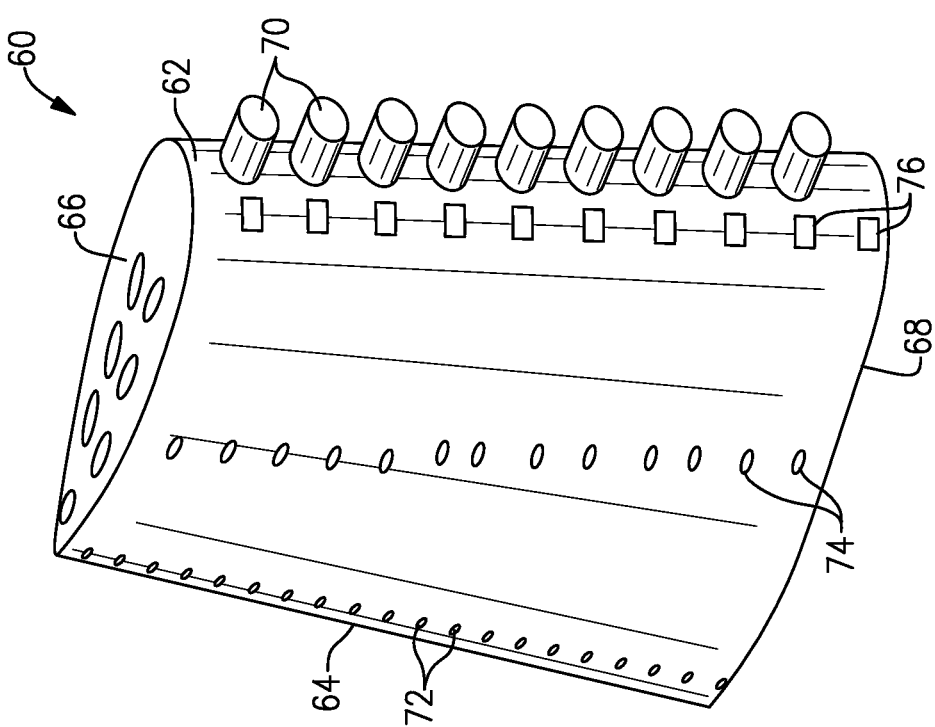
FIG. 2 illustrates a perspective view of an example gas turbine engine component.

FIGS. 2 and 3 illustrate an example gas turbine engine component 60. In the illustrated example, the component 60 is a rake for supporting a plurality of thermal risers 70. The thermal risers 70 are designed to be heated by the external gas path such that the bulk temperature of the thermal risers 70 is equal to that of the flow path total temperature. The thermal risers 70 are typically made of extremely high temperature capable material, such as platinum, where operating at such temperatures have little impact on the thermal riser 70 durability. However, the component 60 could also be an airfoil or another component in a hot gas path airflow of the gas turbine engine 20. The component 60 includes a leading edge 62, a trialing edge 64, a radially inner end 66, and a radially outer end 68. In the illustrated embodiment, the radially outer end 68 of the component is fixed to a portion of the engine static structure 36 downstream of the combustor section 26.

The thermal risers 70 are located along the leading edge 62 of the component 60 and are spaced radially from each other. In this disclosure, radial or radial direction is relative to the engine axis A of the gas turbine engine 20 unless otherwise specified. The thermal risers 70 have an imbedded temperature measurement device within them a sensor that measures the bulk temperature of the thermal riser 70, such as a thermocouple or thermoresistor. The thermal risers 70 are generally cylindrical in shape and extend axially forward of the leading edge 62. Although the thermal risers 70 are cylindrical in the illustrated example, other shapes, such as hexagons, octagons, rectangles, or ellipses, could also be used. The thermal risers 70 measure a temperature of the hot gas path airflow exiting the combustor section 26 at varying radial positions for monitoring the operation of the combustor section 26 and the temperature of the hot gas path airflow entering the turbine section 28. The length of the thermal risers 70 are designed to thermally isolate the measurement portion of the riser at its tip which allows the component 60 to be made of a lower capable material that is actively cooled.

Multiple components 60 can also be spaced circumferentially around the engine axis A in the hot gas airflow path to measure variations in temperature at multiple circumferential and radial locations. In this disclosure, circumferential or circumferentially spaced is relative to a circumference surrounding the engine axis A of the gas turbine engine 20 unless otherwise specified.

Because the component 60 is located immediately downstream of the combustor section 26, the component 60 is subjected to substantial temperatures and requires cooling. The component 60 includes trailing edge cooling passages 72, side cooling passages 74, and leading edge cooling passages 76 to properly cool the component 60. The trailing edge cooling passages 72, the side cooling passages 74, the leading edge cooling passages 76 are in fluid communication with an internal cooling passage 78 for (FIGS. 4-6) and can be formed with additive manufacturing. In the illustrated example, the leading edge cooling passages 76 are non-linear. The internal cooling passage 78 is in fluid communication with a pressurized cooling fluid source, such as the compressor section 24, to feed cooling fluid through the trailing edge cooling passages 72, the side cooling passages 74, the leading edge cooling passages 76 to cool the component 60.

As shown in FIGS. 4-6, the leading edge cooling passages 76 each include an inlet portion 80, an intermediate portion 82, and an outlet portion 84 extending through an outer wall 86 of the component 60. The inlet portion 80 is generally perpendicular to an interior surface 88 of the outer wall 86. The intermediate portion 82 is generally perpendicular to the inlet portion 80 and parallel to the outer wall 86. The outlet portion 84 extends in a direction radially inward from the intermediate portion 82 and is generally tangential to an outer surface 90 of the outer wall 86. However, the outlet portion 84 could also extend in a direction radially outward relative to the intermediate portion 82.

The intermediate portion 82 and the outlet portion 84 define an angle α there between as shown in FIG. 5. In one example, the angle α is between 45 and 90 degrees and in another example, the angle α is between 45 and 50 degrees.

A diameter of the inlet portion 80, the intermediate portion 82, and the outlet portion 84 is approximately 0.08 inches (2.0 mm) The small diameter of the inlet portion 80, the intermediate portion 82, and the outlet portion 84 allows for less cooling fluid to be supplied from the pressurized air source to prevent ingesting hot gases from the hot gas path airflow during operation of the gas turbine engine 20.

As shown in FIGS. 5 and 6, the leading edge cooling passage 76 extends behind the thermal riser 70 such that a portion of the leading edge cooling passage 76 is radially and circumferentially aligned with the thermal riser 70 in order to cool the leading edge 62 of the component 60. Because the leading edge cooling passage 76 extends behind the thermal riser 70 and a film cooling hole 92 exiting the leading edge cooling passage 76 is directed away from the thermocouple 70, the temperature measured by the thermal riser 70 is not influenced by impingement cooling from the leading edge cooling passages 76.

The changes in direction of the cooling fluid traveling through the inlet portion 80, the intermediate portion 82, and the outlet portion 84 increase convective cooling to reduce the temperature of the leading edge 62 of the component 60. The leading edge cooling passages 76 direct the cooling fluid through the leading edge 62 of the component 60 without directing impingement cooling fluid in the direction of the thermocouples 70, which could influence the accuracy of the temperature measurements from the thermocouple 70. The cooling fluid exiting the leading edge cooling passages 76 through the film cooling holes 92 creates vortices that are shed axially downstream towards the trailing edge 64 during operation of the gas turbine engine 20 when the hot gas path airflow is flowing over the component 60.

Figure 7:
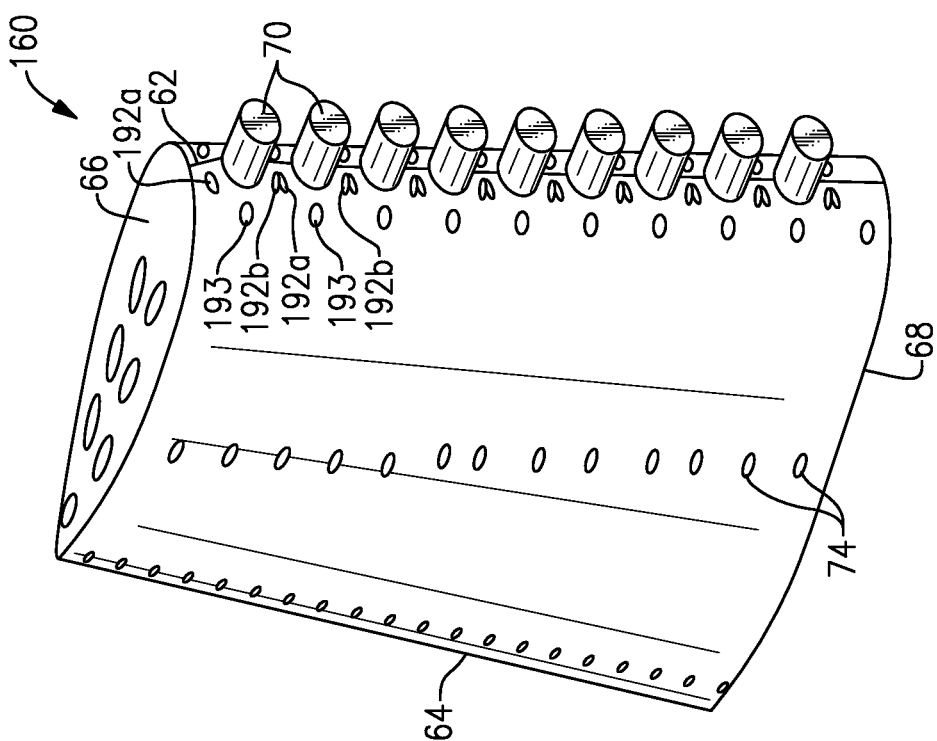
FIG. 7 illustrates another example gas turbine engine component.

FIG. 7 illustrates another example component 160. The component 160 is similar to the component 60 except where shown in the Figures or described below. The component 160 includes the leading edge 62, the trialing edge 64, the radially inner end 66, and the radially outer end 68 similar to the component 60.

Because the component 160 is located immediately downstream of the combustor section 26, the component 160 is subjected to substantial temperatures and requires cooling. The component 160 includes the trailing edge cooling passages 72 and the side cooling passages 74 that were used in the component 60 in addition to leading edge cooling passages 176. The trailing edge cooling passages 72, the side cooling passages 74, the leading edge cooling passages 176 are in communication with the internal cooling passage 78 (FIGS. 8-9).

Figure 8:
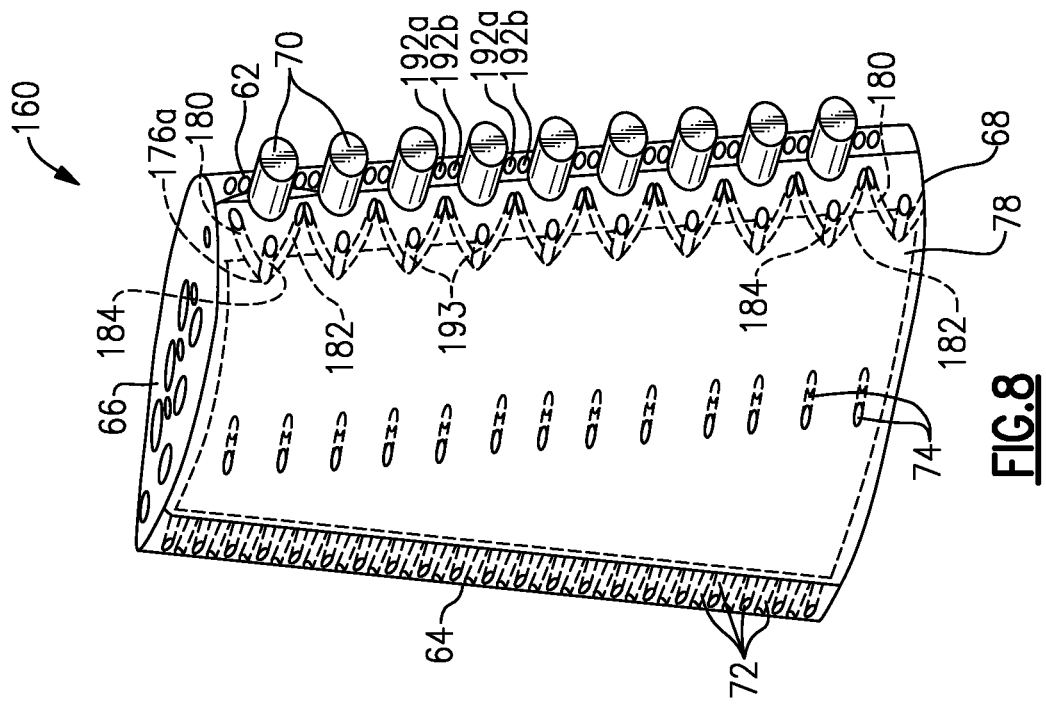
FIG. 8 illustrates cooling passages in the example component of FIG. 7.
Figure 9:
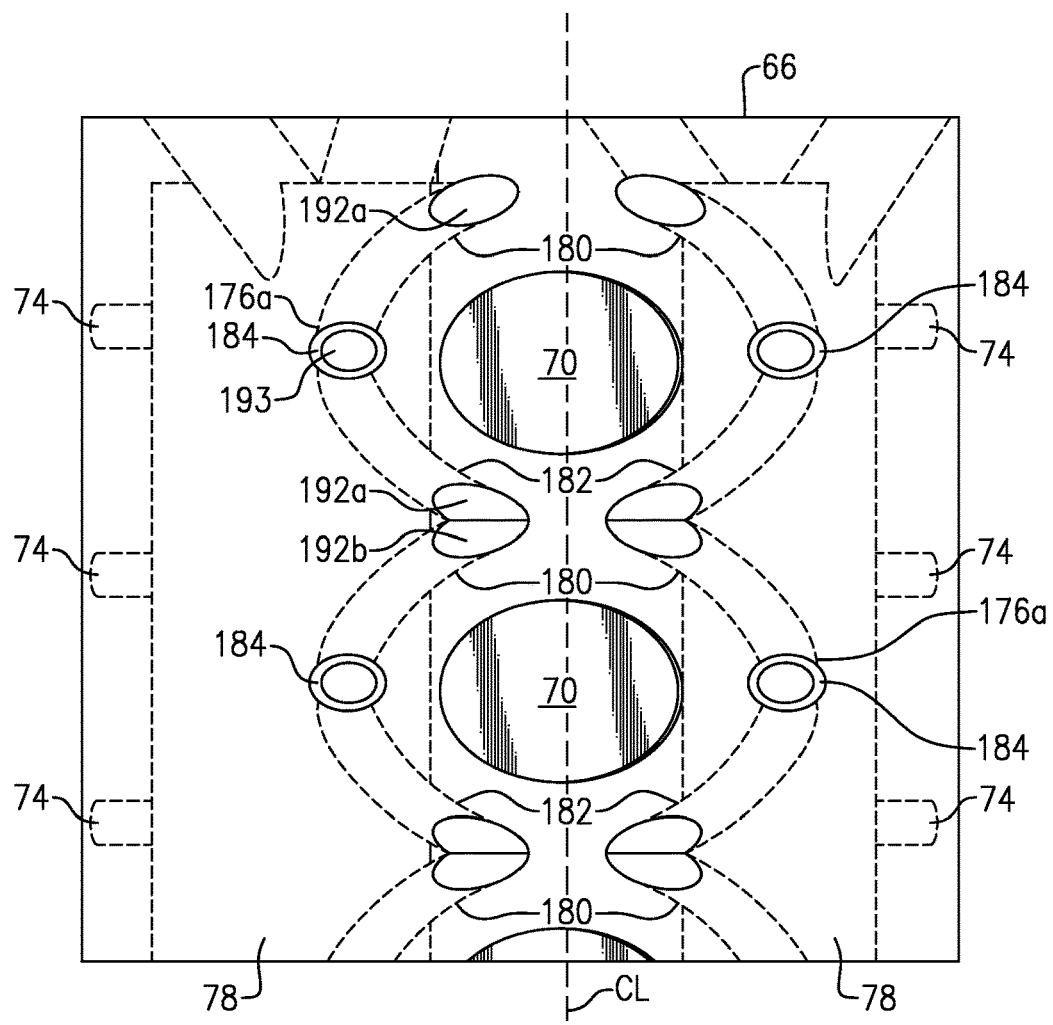
FIG. 9 illustrates an enlarged view of the cooling passages surrounding a leading edge of the component of FIG. 7.

In the illustrated example shown in FIGS. 8 and 9, the leading edge cooling passages 176 include sets of three cooling passages that are generally symmetric about a circumferential centerline CL extending radially through the component 160. The cooling passages 176 branch off from the internal cooling passage 78 at a central location 176a. The set of three cooling passages include a first cooling passage 180 that extends radially inward, a second cooling passage 182 that extends radially outward, and a third cooling passage 184 that extends axially upstream. However, the third cooling passage 184 could be eliminated from the leading edge cooling passages 176 such that only the first cooling passage 180 and the second cooling passage 182 cool the leading edge 62.

Figure 10:
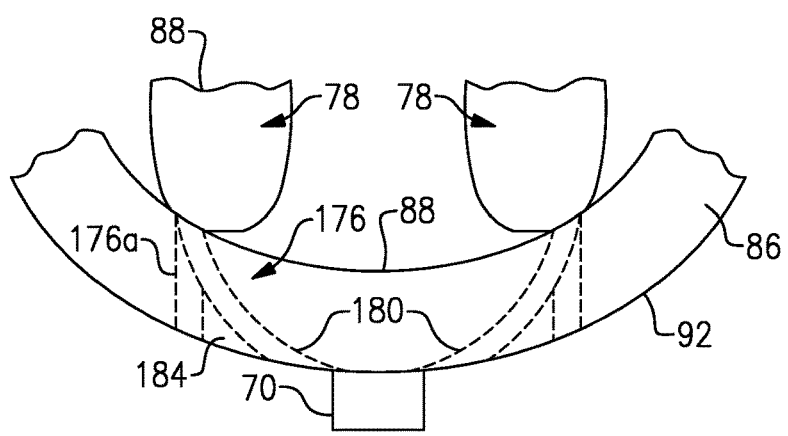
FIG. 10 illustrates film cooling holes for the cooling passages of the component of FIG. 7 in more detail.

The first and second cooling passages 180 and 182 include a curvature in a radial direction as shown in FIG. 9 and in an axial direction as shown in FIG. 10. As shown in FIG. 9, the curvature in the radial direction of each of the first and second cooling passages 180 and 182 circumscribe approximately 25% of an adjacent one of the thermal risers 70, such that the first and second cooling passages 180 and 182 do not extend behind the thermal risers 70. The curvature of the first and second cooling passages 180 and 182 increases the surface area for the cooling fluid to absorb heat from the leading edge 62 of the component 160 without impingement cooling the thermal riser 70.

As shown in FIG. 9, the curvature of the first and second cooling passages 180 and 182 allow the cooling fluid exiting from first and second film cooling holes 192a and 192b, respectively, to flow in a direction is away from the thermal riser 70 that the first and second cooling passages 180 and 182 are circumscribing. This ensures that the stagnation temperature read by the thermal riser 70 is not influence by impingement cooling from the first and second cooling passages 180 and 182. The third cooling passage 184 also includes a third film cooling hole 193.

The cooling fluid is deflected from impinging on one of the thermal riser s 70 radially spaced from the thermal riser 70 that either the first or the second cooling passages 180 and 182 circumscribe. The cooling fluid is deflected at the intersection of the cooling fluid exiting the first and second cooling film holes 192a and 192b because the cooling fluid from the first cooling film hole 192a intersects the cooling fluid from the second cooling film hole 192b at approximately the same angle and deflects the cooling fluid downstream.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A component comprising:
   at least one thermal riser with an embedded temperature measurement device extending from an exterior surface of the component; and
   at least one cooling passage extending through a wall adjoining an interior cooling passage and the exterior surface, wherein the at least one cooling passage is configured to direct cooling fluid through the wall adjacent the at least one thermal riser, the at least one cooling passage includes a curvature in a radial direction and a curvature in an axial direction a first cooling passage extending radially inward and a second cooling passage extending radially outward.

2. The component of claim 1, wherein the at least one temperature measuring device includes a plurality of thermocouples and the at least one thermal riser includes a plurality of thermal risers and at least one of the plurality of thermocouples is embedded in a corresponding one of the plurality of thermal risers and the plurality of thermal risers project outward along a leading edge of the component.

3. The component of claim 1, further comprising a plurality of trailing edge cooling passages extending along a trailing edge of the component and a plurality of side cooling passages located on circumferentially facing sides of the component.

4. The component of claim 1, wherein the at least one cooling passage at least partially circumscribes the at least one thermal riser.

5. The component of claim 1, wherein the first cooling passage includes a first film cooling hole and the second cooling passage includes a second cooling film hole, the first film cooling hole intersects the second film cooling hole.

6. The component of claim 1, wherein the at least one cooling passage includes an inlet portion, an intermediate portion, and an outlet portion with the intermediate portion misaligned relative to the outlet portion.

7. The component of claim 6, wherein the inlet portion extends in a generally perpendicular direction from the interior cooling passage.

8. The component of claim 1, wherein the component is at least one of an airfoil or a rake.

9. The component of claim 1, wherein the at least one cooling passage is configured to direct cooling fluid through the wall adjacent the at least one thermal riser and away from the at least one thermal riser.

10. A gas turbine engine comprising:
    a combustor section;
    a component located downstream of the combustor section comprising:
       at least one thermal riser with an embedded temperature measurement device extending from a leading edge of an exterior surface of the component; and
       at least one cooling passage extending through a wall adjoining an interior cooling passage and the leading edge, wherein the at least one cooling passage is configured to direct cooling fluid through the wall adjacent the at least one thermal riser, the at least one cooling passage includes a curvature in a radial direction and a curvature in an axial direction a first cooling passage extending radially inward and a second cooling passage extending radially outward.

11. The gas turbine engine of claim 10, wherein the first cooling passage includes a first film cooling hole and the second cooling passage includes a second cooling film hole, the first film cooling hole intersects the second film cooling hole.

12. The gas turbine engine of claim 10, wherein the at least one cooling passage includes an inlet portion, an intermediate portion, and an outlet portion with the intermediate portion misaligned relative to the outlet portion.

13. The gas turbine engine of claim 12, wherein the inlet portion extends in a generally perpendicular direction from the interior cooling passage.

14. The gas turbine engine of claim 10, wherein the at least one cooling passage is configured to direct cooling fluid through the wall adjacent the at least one thermal riser and away from the at least one thermal riser.

15. A method of cooling a component comprising:
directing a cooling fluid through at least one non-linear cooling passage in an exterior wall of a component adjacent a thermal riser, wherein a temperature measurement device is surrounded by the thermal riser and the thermal riser projects outwardly from a leading edge of the component; and
directing the cooling fluid through a film cooling hole of the at least one non-linear cooling passage away from the thermal riser.

16. The method of claim 15, wherein the at least one non-linear cooling passage includes a first cooling passage extending radially inward and a second cooling passage extending radially outward.

17. The method of claim 16, wherein the first cooling passage and the second cooling passage at least partially circumscribes the thermal riser.

18. The method of claim 15, wherein the at least one cooling passage includes an inlet portion, an intermediate portion, and an outlet portion with the intermediate portion misaligned relative to the outlet portion.

19. The method of claim 15, wherein the at least one cooling passage is configured to direct cooling fluid through the wall adjacent the thermal riser, the at least one cooling passage includes a curvature in a radial direction and a curvature in an axial direction a first cooling passage extending radially inward and a second cooling passage extending radially outward.

* * * * *